Feb. 22, 1938.  G. E. MARKLEY  2,109,395
MECHANICAL MOVEMENT APPLICABLE TO MATERIAL SCREENING APPARATUS
Filed Nov. 25, 1933   7 Sheets-Sheet 1
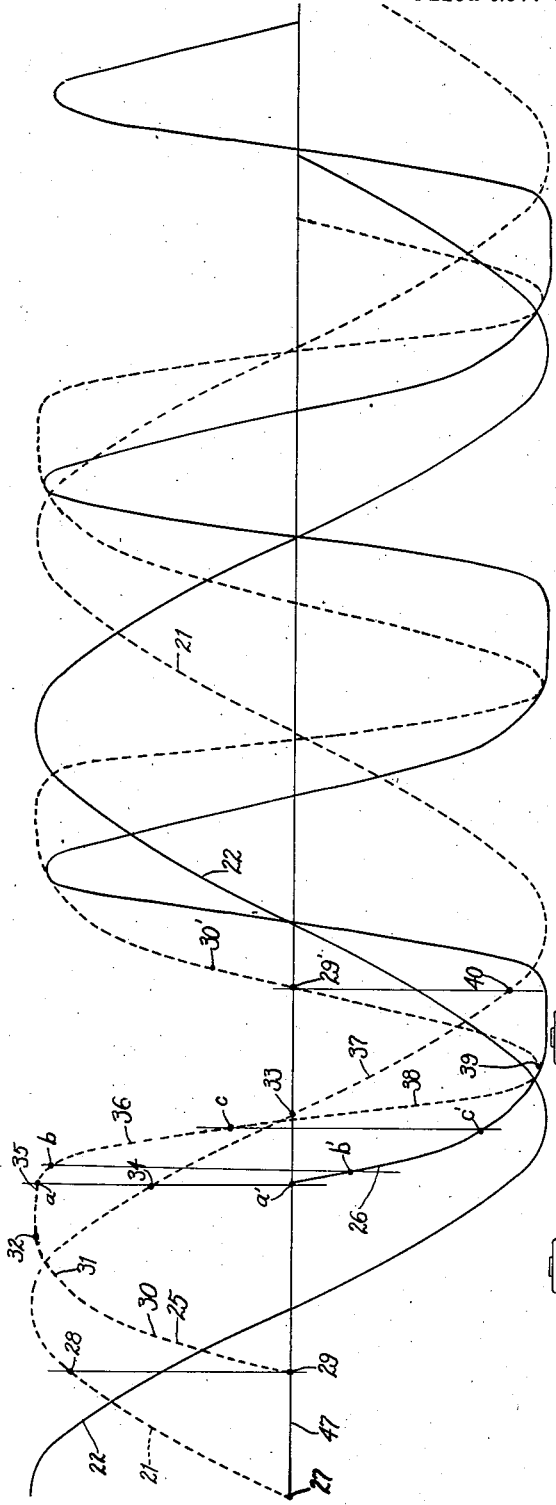
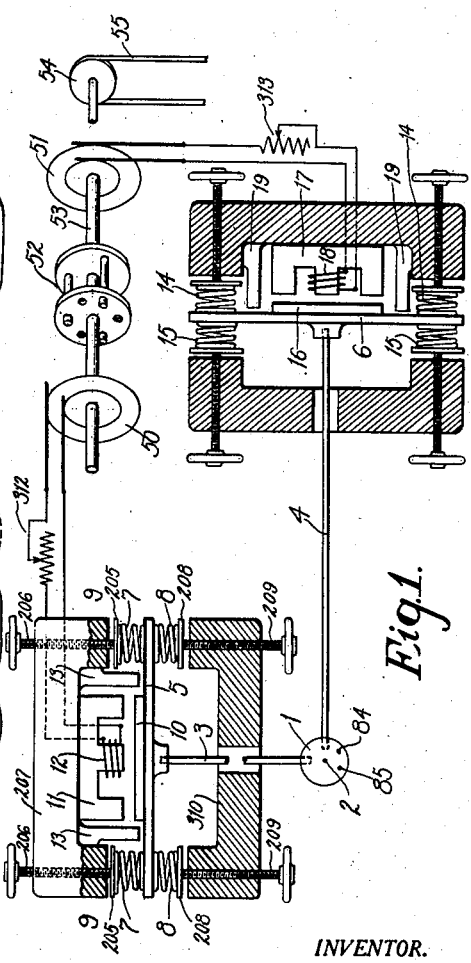
INVENTOR.
George E. Markley.
BY
Slough and Caufield
ATTORNEY.

Feb. 22, 1938. G. E. MARKLEY 2,109,395
MECHANICAL MOVEMENT APPLICABLE TO MATERIAL SCREENING APPARATUS
Filed Nov. 25, 1933 7 Sheets-Sheet 2
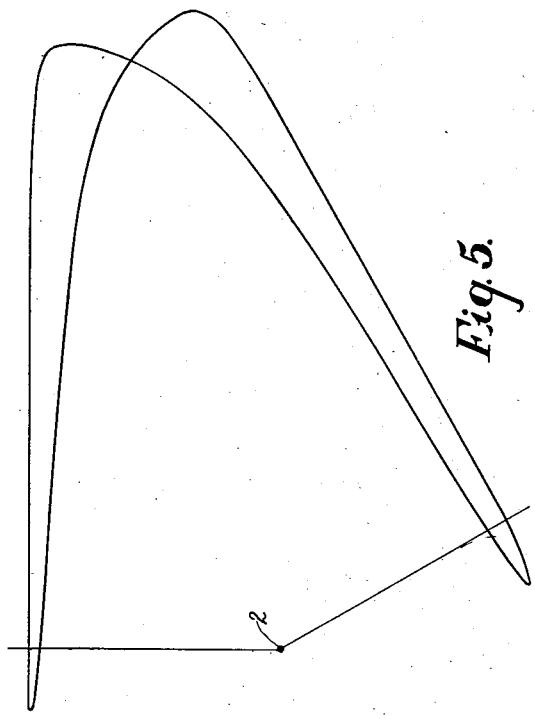
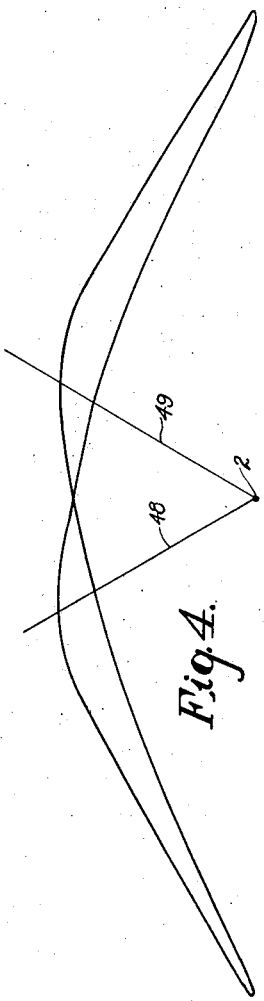
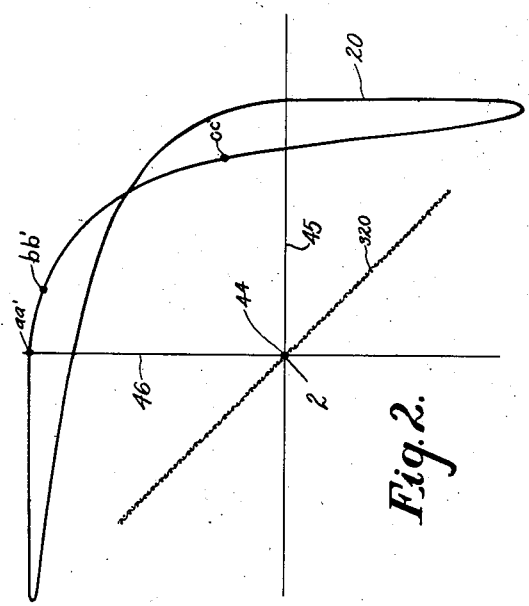
INVENTOR.
George E. Markley.
BY
ATTORNEY.

Feb. 22, 1938.  G. E. MARKLEY  2,109,395
MECHANICAL MOVEMENT APPLICABLE TO MATERIAL SCREENING APPARATUS
Filed Nov. 25, 1933  7 Sheets-Sheet 3
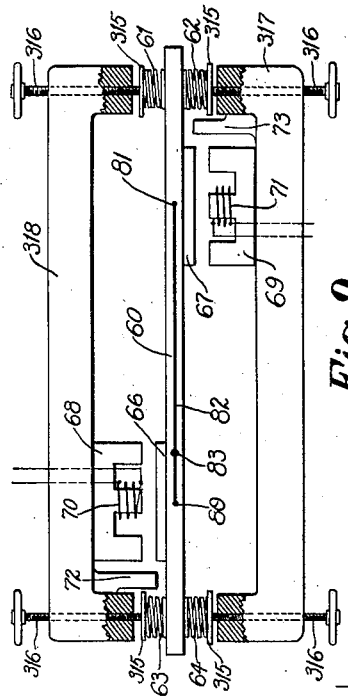
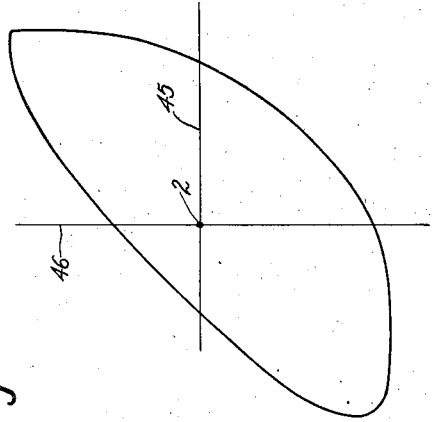
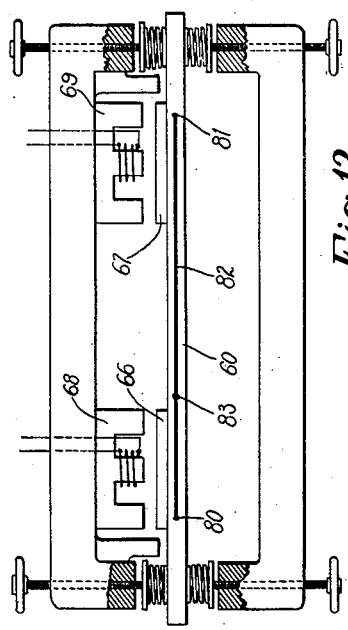
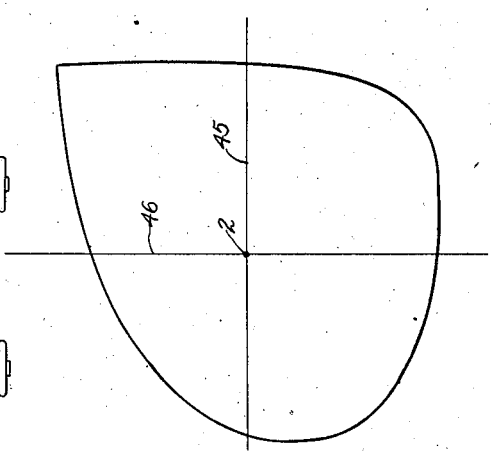
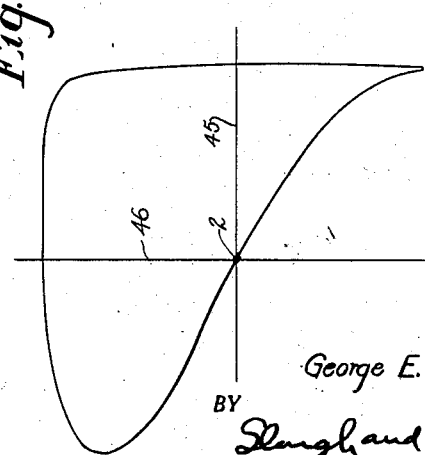
INVENTOR.
George E. Markley.
BY
ATTORNEY.

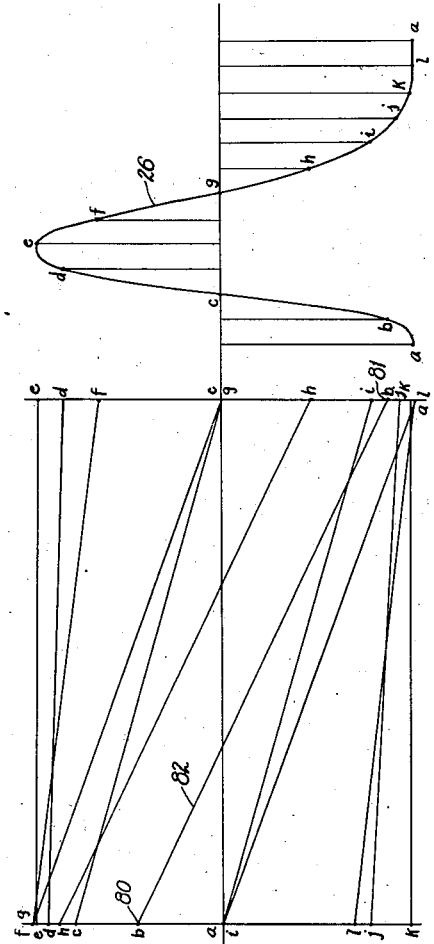
Fig.10.
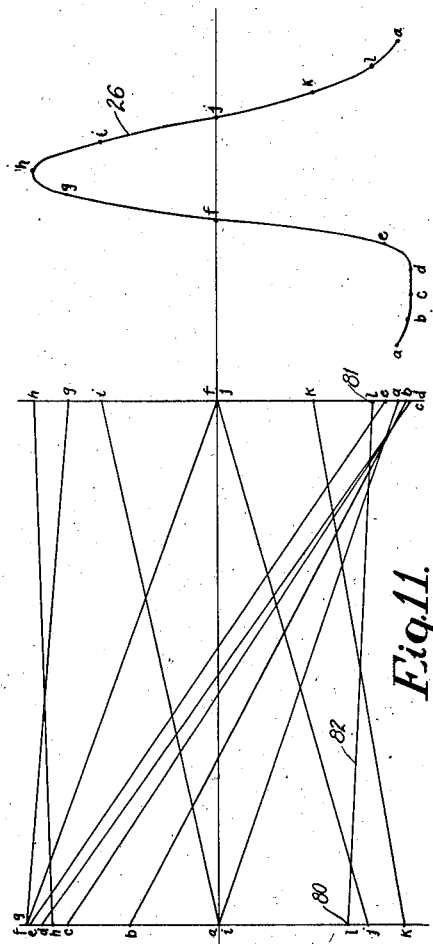
Fig.11.
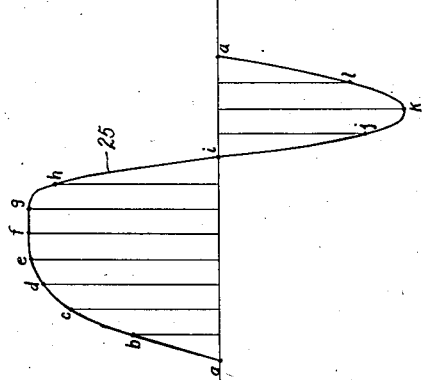
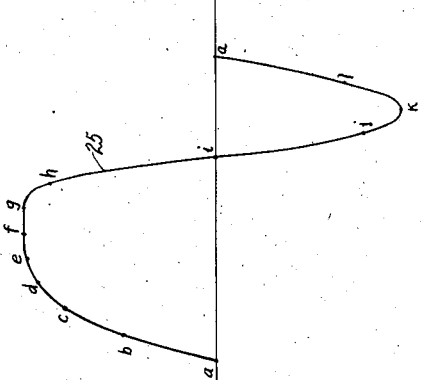

Feb. 22, 1938.   G. E. MARKLEY   2,109,395
MECHANICAL MOVEMENT APPLICABLE TO MATERIAL SCREENING APPARATUS
Filed Nov. 25, 1933   7 Sheets-Sheet 5
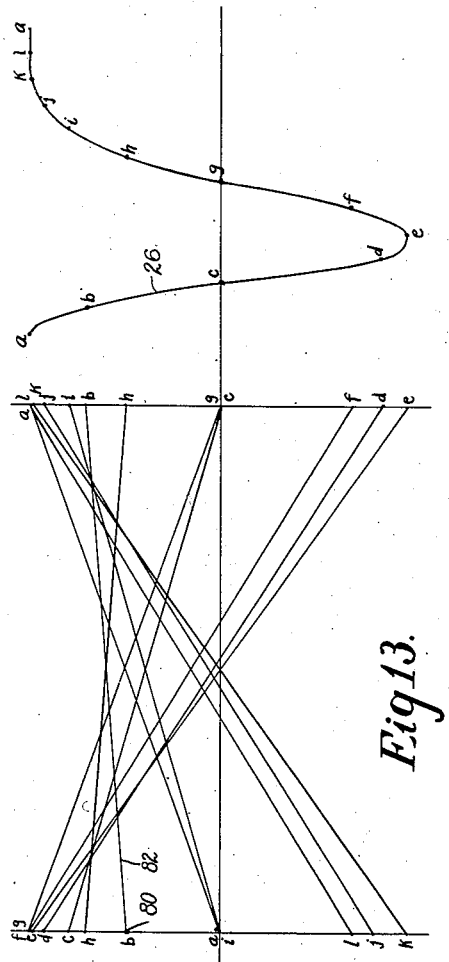
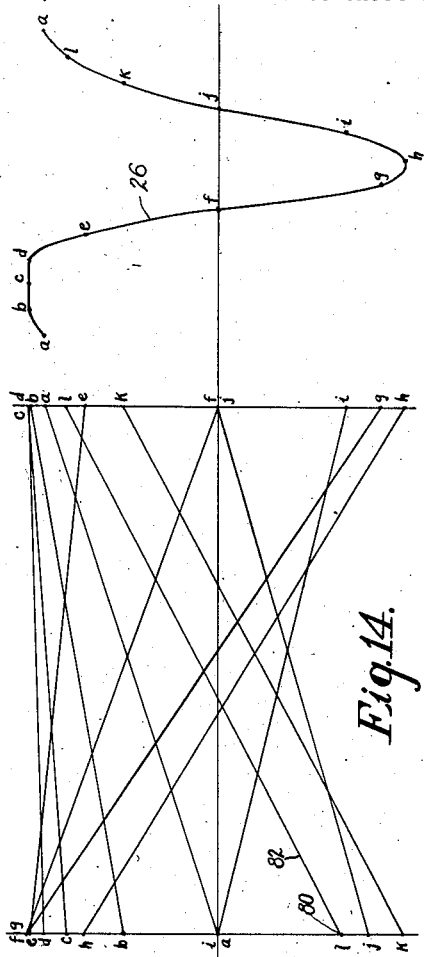
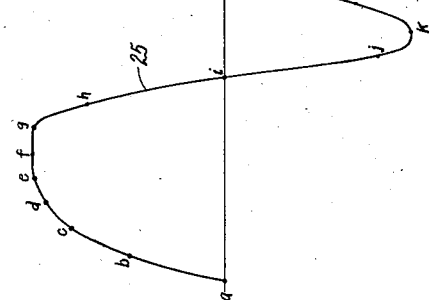
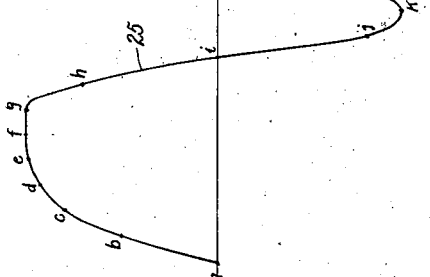
INVENTOR.
George E. Markley.
BY
ATTORNEY.

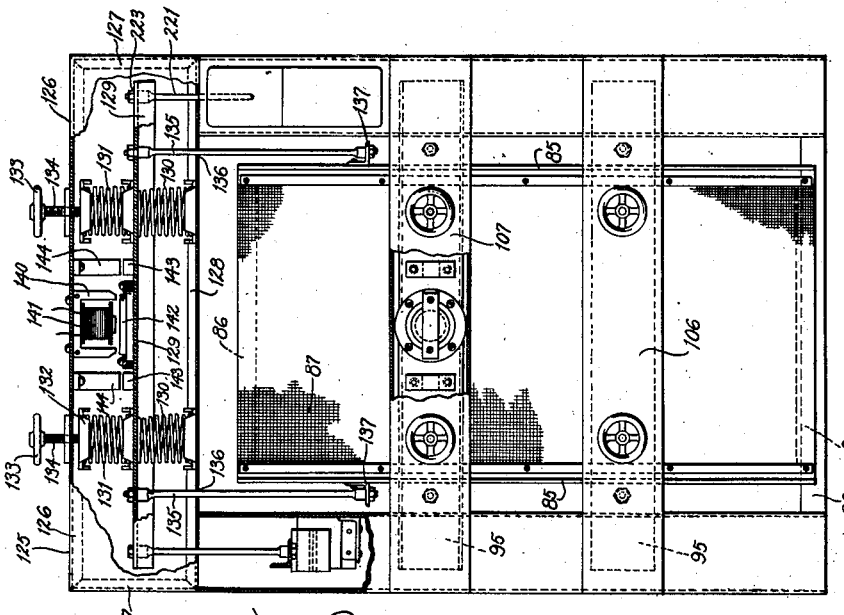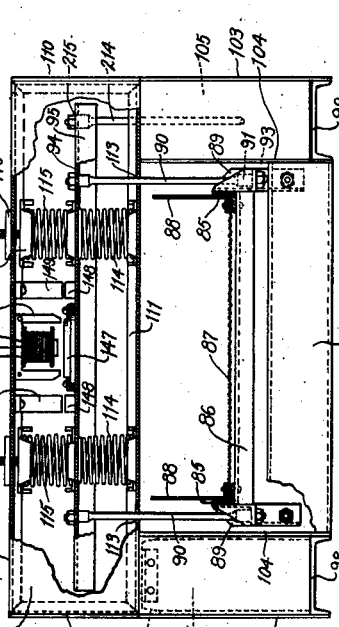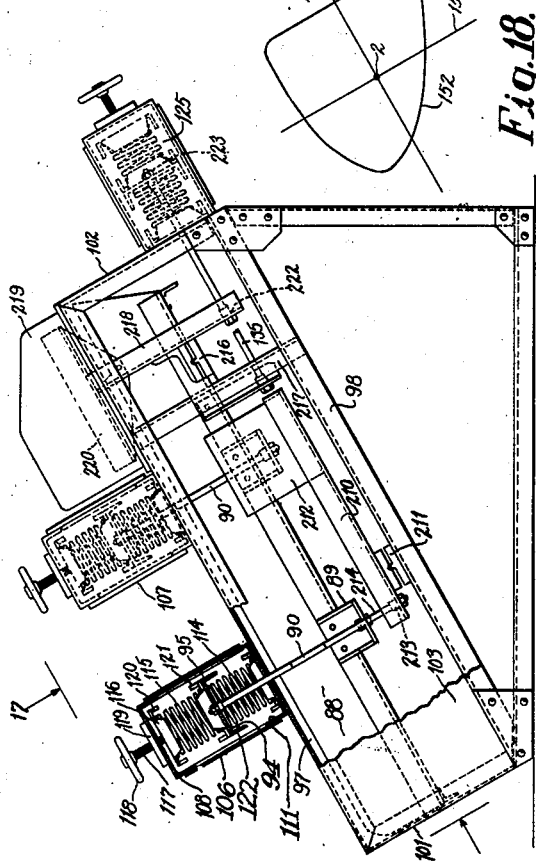

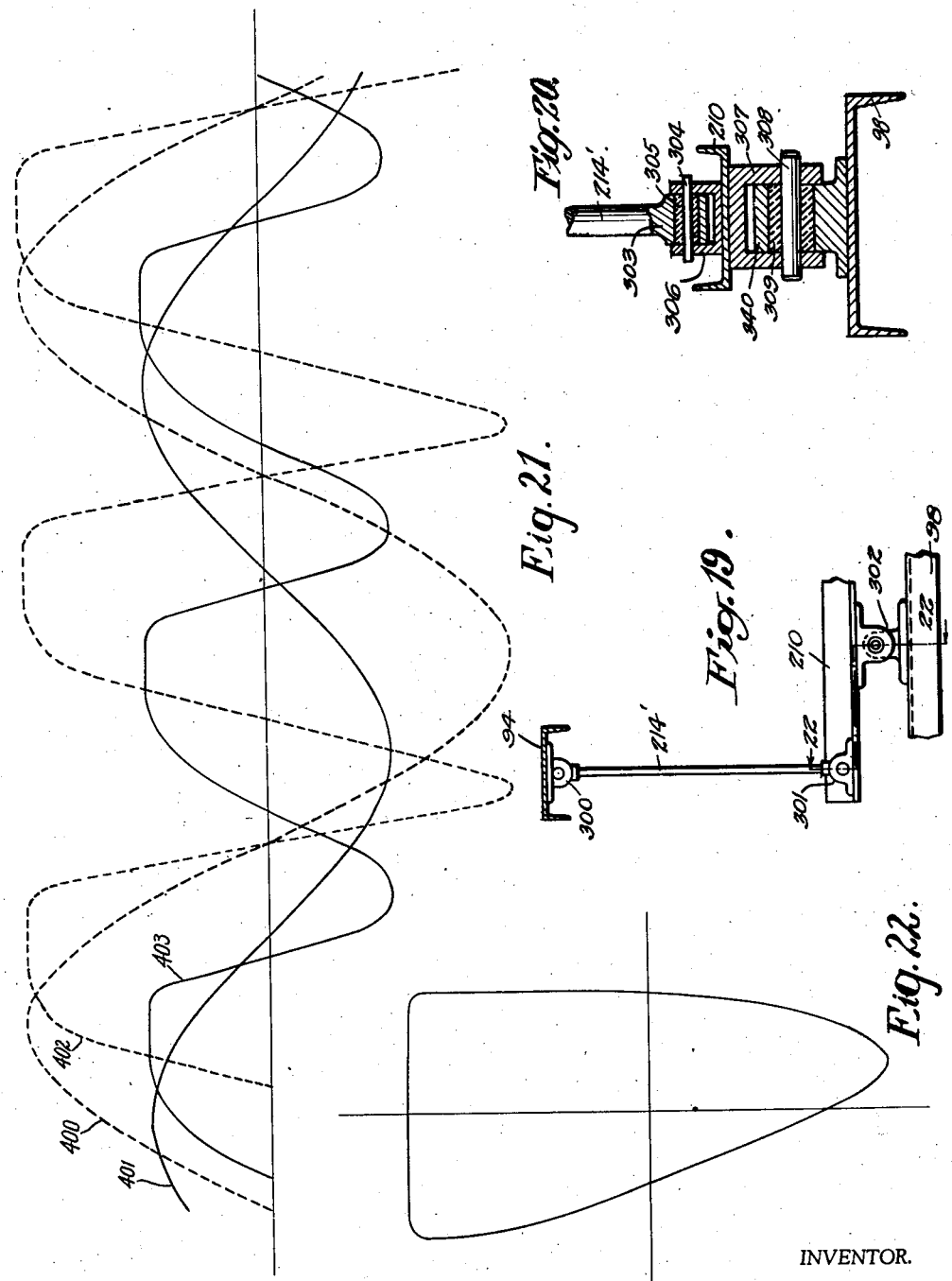

Patented Feb. 22, 1938

2,109,395

UNITED STATES PATENT OFFICE 2,109,395

MECHANICAL MOVEMENT APPLICABLE TO MATERIAL SCREENING APPARATUS

George E. Markley, Cleveland Heights, Ohio

Application November 25, 1933, Serial No. 699,691

43 Claims. (Cl. 209—326)

This invention relates to cyclical movements and to the methods and means of producing them.

Cyclical movements are employed in various of the practical arts illustrative of which is the art of screening material by cyclically moving a perforated sheet or open fabric screen or the like upon which discretely composed material is supported.

In some instances and in some arts the cyclical movements employed are so rapid as to be correctly described as vibratory; and hereinafter the term cyclical-movements or its derivatives is used as inclusive of vibratory-movements.

Hereinafter is described the theory underlying the production of cyclical movements according to my invention together with a general means and method of producing the same for any purpose or in any mechanical art; and this is followed by an illustrative application of my invention to the art of screening material.

It is an object of my invention to provide an improved general method for producing cyclical movements.

Another object is to provide a novel cyclical movement and the means and method of producing the same.

Another object is to provide a novel cyclical movement and a method and means for producing the same whereby said movement may be variously modified to adapt it to various uses.

Another object is to provide an improved means and method of producing cyclical movements employing electro-magnetic tractive energy to produce the movement.

Another object is to provide an improved means and method of producing cyclical movements employing a plurality of tractive electro-magnets energized by respective periodic electric currents in time spaced phase relation.

Another object is to provide an improved means and method of producing cyclical movements employing a plurality of tractive electro-magnets respectively exerting tractive effort in different directions.

Another object is to provide an improved means and method of producing cyclical movements employing a plurality of tractive electro-magnets energized by respective periodic electric currents in time spaced phase relation, and respectively exerting tractive efforts in different directions.

Another object is to provide an improved means and method for supporting a cyclically movable material handling screen.

Another object is to provide an improved means and method for effecting cyclical movement of a material-handling screen.

Another object is to provide an improved cyclical movement adapted to be applied to material-handling screens, to effect a screening of material in an improved manner.

Another object is to provide an improved method and means for applying periodic electro-magnetic tractive efforts to a material-handling screen to cyclically move the same with a screening movement.

Another object is to provide an improved cyclical movement for material-handling screens and a method and means for producing the same by electrical power.

Another object is to provide an improved cyclical movement for material-handling screens and a method and means for producing the same, whereby different portions of the screen may have different kinds of movement.

Another object is to provide an improved method and means for effecting cyclical movement of a material-handling screen susceptible of variations of movement to adapt the screen to the screening of different kinds of material.

Another object is to provide an improved electric or electro-magnetic motor for producing cyclical and/or vibratory movements.

Another object is to provide an improved means for producing cyclical movements whereby the nature or path of the movement and/or the amplitude thereof may be adjustably changed.

Another object is to provide an improved supporting means for supporting an article or object to be cyclically moved.

Another object is to provide, in a support for an object or article to be cyclically moved, an improved means for counterbalancing the weight and/or inertia of moving portions of the article or object being cyclically moved.

Another object is to provide, in a support for an object or article to be cyclically moved, an improved means for absorbing vibration of the article to prevent the transmission thereof to the support or the building floor or the like upon which the support may rest.

Another object is to provide, in an apparatus for cyclically moving or vibrating an object or article, improved means for adjustably changing the path of the movement or the amplitude thereof or both, while the article or object is being cyclically moved.

Other objects will be apparent to those skilled in the art to which my invention appertains.

My invention is fully disclosed in the following description taken in connection with the accompanying drawings, in which:

Fig. 1 is a view, generally diagrammatic, illustrating an apparatus wherein my invention may be embodied and whereby the method thereof may be practiced;

Fig. 2 is a diagram illustrating one form of movement which may be produced by the apparatus and method of my invention;

Fig. 3 is a diagrammatic view illustrating the wave form of periodic movement of elements employed in the practice of my invention and illustrated in one form in Fig. 1 and correlative with alternating current wave forms utilized to energize the apparatus embodying my invention;

Figs. 4, 5, 6, 7 and 8 are views similar to Fig. 2 but illustrating other forms of movement which may be produced;

Fig. 9 is a view generally similar to Fig. 1 illustrating another form of apparatus which I may employ;

Figs. 10 and 11 are views generally similar to Fig. 2 illustrating forms of movement which may be produced with the apparatus of Fig. 9;

Fig. 12 is a view generally similar to Fig. 9 but illustrating a modification;

Figs. 13 and 14 are views similar to Figs. 10 and 11 but illustrating movement forms which may be produced by the apparatus of Fig. 12;

Figs. 15, 16 and 17 are, respectively, side elevational, end elevational and plan views of an apparatus whereby my invention may be applied to the vibratory movement of a material handling screen;

Fig. 18 is a view to an enlarged scale illustrating the movement of a point in the screen of Figs. 15, 16 and 17.

Figs. 19 and 20 are views illustrating a modification of a connection construction which I may employ in the various embodiments illustrative of my invention.

Fig. 21 is a view generally similar to Fig. 3 illustrating the effect upon the wave form of the periodic movement of adjustably changing the amplitude and phase displacement of the alternating current waves and of adjustably changing the spring tension of certain resilient elements which I may employ and illustrating the consequent effects upon the wave form of the periodic movement.

Fig. 22 is a view illustrating in diagrammatic form the form of the movement which may be produced by the wave form of movement of Fig. 21.

Referring to the drawings, in Fig. 1 I have illustrated in diagrammatic form an apparatus whereby a cyclical movement may be produced in accordance with my invention. At 1 is indicated generally a mass which represents an element of the article, or object, or apparatus or the like to which the cyclical movement is to be applied, and a central point 2 in the mass is indicated as a particular point in the mass 1, the movement of which is here under consideration; and hereinafter the path of the point 2 will be described for cyclical movement given to the mass 1.

At 3 and 4 are indicated a pair of laterally flexible, preferably resilient, bars rigidly secured at one end in the mass 1 and extending laterally therefrom at an angle of approximately 90° and converging in the mass 1 toward the point 2. The outer ends of the bars 3 and 4 are rigidly secured to transverse frame elements 5 and 6, disposed substantially at right angles to the bars 3 and 4.

At opposite ends of the frame element 5 and preferably at suitable distances from the bar 3, the frame element 5 is engaged on opposite sides thereof by pairs of helical compression springs 7—7 and 8—8. The springs abut at one end upon the opposite sides of the frame element 5. The opposite ends of the springs 7—7 abut upon heads 205—205 of adjusting screws 206—206 threaded in a stationary frame member 207. The springs 8—8 abut at their other ends upon corresponding heads 208—208 associated with adjusting screws 209—209 threaded in a frame member 310. The springs 7 and 8 are under initial compression and thus resist movements of the frame element 5 in lateral directions thereof.

A ferrous armature 10 is rigidly mounted upon the frame element 5 and is disposed opposite the poles of an E-form electromagnet 11 having an energizing winding 12 on the middle pole. Movement of the armature 10 in the direction toward the magnet 11 is stopped by a pair of stops 13—13 on the frame member 207 upon which the frame element 5 may impinge.

The other frame element 6 is similarly mounted, being disposed between compressed pairs of adjustable springs 14 and 15 and an armature 16 thereof disposed to be attracted by a magnet 17 having a winding 18 and the frame element 6 being adapted to be stopped upon stops 19—19.

The parts thus described are constructed and arranged so that upon energization of the windings 12 and 18, the armatures 10 and 16 will be drawn toward the magnets in the well known manner and the corresponding movement of the frame elements 5 and 6 will be stopped upon their respective stops 13 and 19 before the air-gap between the armature and the magnet is entirely closed to prevent impact of the armature upon the magnet.

The frame elements 5 and 6 are normally maintained in an intermediate or normal position by equalization of the springs 7 and 8 and 14 and 15 with a considerable air gap between the armature 10 and magnet 11 and between the armature 16 and the magnet 17.

Upon energizing the winding 12, the armature 10 will be attracted, compressing the springs 7—7 and exerting a pull on the bar 3 moving the point 2 upwardly, and upon de-energizing the winding, the springs 7 will react and push the point 2 downwardly. Similarly, the winding 18 when energized will pull the point 2 toward the right and upon de-energizing the winding the springs 14 will react and shove the point 2 back toward the left. Movement of the point 2 vertically and horizontally as viewed in the drawings is permitted by the lateral flexibility of the bars 4 and 3, respectively.

According to one mode of practicing my invention, the windings 12 and 18 are energized by independent energizing circuits with alternating current, preferably of sine form, and with the current in one winding approximately 90° out of phase with the current in the other winding.

With the bars 3 and 4 moving the mass 1 in directions 90° apart as illustrated, and with the energizing current 90° apart in phase, the point 2 of the mass 1 will move with a cyclical movement in general like that illustrated in Fig. 2 at 20, and this fact will now be explained in connection with Fig. 3. The resultant movement 20, presupposes a suitable natural periodicity of the springs 7 and 8 and 14 and 15 which will appear as the description proceeds.

Referring to Fig. 3, I have illustrated at 21 and 22, respectively, the two sine form alternating currents 90° apart in phase represented graphically in the conventional manner. The windings 12 and 18 are respectively energized by the currents 21 and 22.

At 25 and 26, respectively, is indicated the nature and extent of the movements of the armatures 10 and 16 resulting from the energization of the windings 12 and 18 and the reactions of the springs 7 and 14 and 8 and 15.

The shape of the curves 25 and 26 will now be explained for the curve 25. During the time that the current curve 21 is rising from its zero value at 27 to a value 28, the pull of the magnet 11 is in the direction to overcome the springs 7—7. At the current value 28, however, the pull overcomes the springs 7—7 and the armature 10 begins to move toward the magnet, the movement being illustrated by the curve 25 starting from zero at 29. While the armature is moving toward the magnet, the air gap thereof is decreasing, and the armature movement is an accelerating movement due to this fact, and to the fact that the current 21 is still rising above the value 28. The curve 25 therefore has a relatively steep portion 30 as it rises from zero. Toward the upper part of the portion 30, the springs 7—7 become compressed sufficiently to influence the curve 30 and it bends over at its upper portion 31. At 32, the armature is stopped by the impingement of the element 5 upon the stops 13—13.

The current 21 has by this time reached its maximum and started to decrease toward its zero 33. The armature 10 remains in its attracted position due to the small air gap until the current has fallen to the value 34. The magnet then "lets go" as at 35 due to the counter-action of the springs 7—7, and the armature moves away from the magnet with a rapid movement indicated by the curve portion 36. The current rises in the opposite sense, from the zero 33, as indicated at 37, and as stated hereinbefore, these lower values of current are not sufficient to materially affect the position of the armature. However, the retractive expansion of the springs 7—7, and inertia, rapidly move the armature beyond its zero or neutral position with a movement defined by the curve portion 38, this curve portion being generally a harmonic curve or wave, reaching a maximum value at 39. The springs 8—8 are now under compression and react to return the armature towards its neutral or midway position indicated at 29'.

The periodicity and resilient force of the springs 7—7 and 8—8 may be readily determined, as will be understood by those skilled in the art, to cause the maximum throw or reaction of the armature to the maximum position 39 to be of substantially the same amplitude as the point 32, and to return the armature, by reaction of the compressed springs 8—8, to the zero point 29' substantially at the same time that the current rising along the portion 37 reaches a value 40 corresponding to the value 28 above referred to, so that the movement of the armature back towards its neutral position by the action of the springs 8—8 will merge into a movement thereof effected by the pull produced by the current beyond the point 40; and thus the armature will move rapidly through the zero at 29' and begin a second wave of motion as at 30' corresponding to the wave portion 30 above described, the wave portion 30' and its subsequent values being determined by the current wave 37, particularly the values thereof at and beyond the point 40.

As will be understood, of course, the wave 30' is indicated as positive, similar to the wave 30, although the current wave 37 is negative with respect to the current wave 21.

In this way, a movement curve for the armature 10 is found, comprising the wave portions 30—36, etc., reaching a maximum value at 32 in one direction and intermediate waves 38 reaching a maximum value 39 as illustrated in Fig. 3, the same being produced by the sine form current wave 21 energizing the magnet winding 12, for suitable springs 7 and 8. In a like manner, movement of the armature 16 is represented by the curve 26 when the magnet winding 18 is energized by current according to the wave 22.

The movements of the armatures 10 and 16 according to their respective curves 25 and 26 of Fig. 3, are transmitted concurrently to the point 2 of the mass 1. The movement of the point 2 is illustrated in Fig. 2.

Referring to Fig. 2, the normal position of the point when both magnets are de-energized is indicated at 44. Movements of the armature 10 by the magnet 11 move the point in the direction of the axis 46, and movements of the armature 16 move the point in the direction of the axis 45.

In this connection, it will be observed that when the armature 10 moves toward and from its magnet, the bar 4 bends causing the point 2 to move on a line at the left-hand end of the bar 4 as viewed in Fig. 1, the line being actually slightly curved around a center or approximate center somewhere near the right-hand end of the bar 4. In a similar manner, when the armature 16 moves toward and from its magnet, the point 2 moves in a slightly curved path with the lower end of the bar 3 around an approximate center somewhere near the upper end of the bar 3.

The extent of movement of the point 2 in these directions is so small compared with the length of the bars that the movement is substantially a straight line and to avoid complications in this discussion of the theory, the vertical and horizontal movements of the point 2, that is, parallel to the axes 46 and 45, is considered as rectilinear movement. As will be apparent, as the discussion proceeds, the theoretical explanation of the movements of the point 2 will apply with equal accuracy to its movements if considered along axes such as 45 and 46 having curvature as above mentioned.

The path of the point 2 illustrated in Fig. 2 may be derived from the curves 25 and 26 of Fig. 3 in the following manner.

In Fig. 2, ordinates of the curve 25 of Fig. 3, for armature 10, respectively above and below the neutral axis 47 of Fig. 3, are disposed in Fig. 2 parallel to the axis 46, respectively above and below the axis 45; and similarly, ordinates of the curve 26, for armature 16, respectively below and above the axis 47, are disposed, in Fig. 2, parallel to the axis 45 and respectively to the right and to the left of the axis 46. In Fig. 3, simultaneous values of the curves 25 and 26 are indicated respectively by the characters $a, b, c \ldots$ and $a', b', c' \ldots$ etc., and when these concurrently occurring values, or positions of the armatures 10 and 16 in Fig. 3 are transferred from Fig. 3 to Fig. 2, the solid line curve in Fig. 2 will represent the path of movement of the point 2.

As an illustration, when the armature 10 is starting to move away from the magnet, the point 2 has a downward vertical movement and is in a position indicated at b on the curve 25; and at the same time, the armature 16 is moving toward the right, toward the magnet 17, and the point 2 has moved with it to a position indicated by the reference character b' on the curve 26. The resultant position of the point 2 is the resultant of these two movements concurrently, that is, downwardly and to the right, and the point 2 in Fig. 2 is in the position indicated at bb'.

In a like manner, the "simultaneous" positions for the point 2 on the two curves 25 and 26, found by drawing ordinates through the two curves 25 and 26 of Fig. 3, may be located in Fig. 2 to produce the curve of that figure.

From the foregoing it will now be apparent that the curve of Fig. 2, which may be described as generally in the form of a bent figure eight, is the path of the point 2, a characteristic point in the mass 1, when the mass is acted upon concurrently by a pair of armatures supported in a manner to constrain them to tend to move with a periodic movement of predetermined inherent periodicity, and when the lines of action of the two armatures are at an angle of 90° to each other and when the electro-magnets which move the armatures are energized with periodic currents of siné wave form in substantially 90° phase relation. The curve of Fig. 2, may, therefore, for purposes of this discussion, be referred to as the general path of movement of the point 2, in view of other specific forms presently to be considered. It will, of course, be observed that Fig. 2 is considerably magnified. In actual practice the upper portions of the curve 20 may be only $\frac{3}{32}$ or $\frac{1}{8}$" above the axis 45.

The curve of Fig. 2 lies substantially in a plane, the plane of the paper, when the bars 3 and 4 of Fig. 1 lie in the same plane, and when the armatures 10 and 16 move in that plane; and the curve has a definite position in space corresponding to the disposition of the parts in Fig. 1 wherein the bar 3 is disposed substantially vertically and the bar 4 substantially horizontally. Thus, one loop of the figure eight curve is disposed generally vertically and the other loop generally horizontally, and the general configuration of the curve is concave-convex and generally symmetrical about an inclined axis with the concave side directed generally downwardly toward the left as viewed in the drawings. The movement represented by Fig. 2 is greatly magnified with respect to the diagrammatic apparatus of Fig. 1 which produces it as is also the diagram of Fig. 3 from which it is derived.

The general form of cyclical movement illustrated in Fig. 2 may be variously modified to adapt it to specific uses. Various modifications may be effected either by changing the angular direction of movement of the armatures 10 and 16, with respect to the point 2, or by changing the angle of phase displacement of the two magnet energizing current waves, or by changing the shapes of the movement curves 25 and 26 of Fig. 3. It will be understood, of course, that any one of these changes may be made independently of the others or they may be combined and the resulting movement curve corresponding to Fig. 2 may be the result of changing any one of these factors or any combination of two or more of them.

Furthermore, for any given form of movement, such as Fig. 2, the frequency of the movement or of the cycle thereof, and the amplitude thereof and the position of the path of the cyclical movement in space, may be varied.

The frequency of the movements will obviously be determined by the frequency of the energizing electric current. In order that the springs 7—7 and 8—8 will respond at the frequency of the alternating current, it is preferable that their own natural periodicity be higher than that of the alternations.

The amplitude of the movements will obviously be determined by the amplitude permitted for the armatures 10 and 16 resulting from the position of the stops 13 and 19 and the reactive throw of the springs. If in Fig. 1 the screws 206—206 be screwed inwardly, it will increase the distance of the frame element 5 from the stops 13—13 and increase the amplitude of movement; and similarly, if the screws 209—209 be screwed outwardly. The amplitude will obviously be shortened if the screws 206—206 be screwed outwardly or the screws 209—209 be screwed inwardly.

As to the position of the movement curves in space, it will be apparent that the position in space of the particular curve of Fig. 2 is that illustrated because the armature 10 is acting vertically through the bar 3 and the armature 16 acting horizontally through the bar 4, and that the reaction of the springs 7 and 8 and 14 and 15 are in these same directions. Therefore, it will furthermore be clear that if, without changing the angle between the bars 3 and 4, the entire diagrammatic apparatus of Fig. 1 be rotated around the point 2 as a center of rotation, and if the apparatus be operated as above described in any such rotated position, the movement path of Fig. 2 will correspondingly be produced in any such rotated position. In other words, the path movement of the point 2 may be made to take up any of the positions in space which the curve of Fig. 2 would take up upon rotating the paper of the drawing in its own plane before the observer about the point 44 as an axis. The importance of this feature will be clear hereinafter when an illustrative practical application of my invention is explained in connection with a material handling screen.

The changes in the form of the movement path effected by changing the angle between the directions of pull of the two magnets is illustrated in Fig. 4 wherein also is illustrated a different position in space for the path of movement.

In this figure, the axis 48 represents the direction of pull of the bar 3 and the axis 49 that of the bar 4. The axes 48 and 49 embrace therebetween an angle of approximately 30°. The movement path of Fig. 4 is obtained from the curve Fig. 3 with the same values that were used in producing Fig. 2, having due respect to the direction of the axes 48 and 49. As will be observed, the movement path is generally flatter having less concavity. Inasmuch as the axes 48 and 49 are disposed symmetrically about a vertical line, the path of Fig. 4 is disposed in space symmetrically around a vertical axis as distinguished from Fig. 2 which is symmetrical around a sloping axis.

In Fig. 5 the same values of Fig. 3 are reduced to a movement curve made by apparatus in which the bars 3 and 4 are relatively disposed at an obtuse angle of approximately 150° with the result that a much more concave movement curve appears.

Thus widely different paths of the cyclical movement may be produced by changing the angle of direction of pull of the magnets as in Figs. 2 and 5, other factors remaining unchanged, or as in Fig. 4 by changing both the angle of direction and the position in space.

The second above-mentioned manner of changing the path curve, namely by changing the angle of phase displacement of the two currents, will now be considered.

The movement curves 25 and 26 of Fig. 3, produced by the alternating current curves 21 and 22 respectively, are, as shown in that figure, 90° apart in phase, producing the motion curve of Fig. 2. If current waves such as 21 and 22 are employed to energize the two electro-magnets but spaced apart 60° in phase instead of 90°, motion curves like 25 and 26 will result spaced 60° apart in phase; and with all other factors remaining the same, if a curve is constructed as before using simultaneous values of these motion curves, the curve will be that of Fig. 6. As will be seen, this curve is substantially triangular and has lost the figure eight form of Fig. 2. Curve Fig. 6 is drawn to smaller scale than Fig. 3 from which its values are taken.

Again, if the phase angle be changed to 30°, the motion curve of Fig. 7 will be produced, other factors remaining the same, which, as seen, is generally of the order of a circle except for the corner at one side thereof. Again, if the phase angle be changed to 15°, the motion curve of Fig. 8 will be produced which, as seen, is generally that of an ellipse.

The curves 6, 7 and 8 are produced as above explained with the lines of action of the two electro-magnets at 90° with each other, and therefore the motion curves of these figures may be further modified by changing the angle of pull of the magnets as has been explained in connection with Figs. 2, 4 and 5. Furthermore, the position of these curves in space may also be changed to any desired position by rotating the apparatus in space around the point 2 to different positions, the resulting curve in space being that which will appear upon rotating the sheet of drawing before the observer.

The curves of Figs. 2, 6, 7 and 8 are merely illustrative of motion curves which may be produced according to the foregoing method and means when the phase angles are the well known angles of 90°, 60°, 30° and 15°; and obviously, other different forms of motion curves would be produced for intermediate angles or for angles greater than 90°.

In producing the curves, Figs. 6, 7 and 8, the method above described for producing the curve of Fig. 2 is employed, the difference being that for any instantaneous value on the curve 25, the corresponding instantaneous value on the curve 26 is the value which would be the simultaneously occurring concurrent value if the two curves 25 and 26 were in Fig. 3 displaced by the phase angle in question instead of being displaced 90° as illustrated.

In all of the foregoing cases, the movement of each of the armatures goes on alike in each case, the great variety of motions possible to be produced thereby being effected as above explained by merely a change of direction of pull of the magnet and a change in phase displacement of the magnet movement; and thus the movements of the magnet armatures may be described as relatively at an angle with each other in direction and at an angle with each other in time.

The third general means by which the shape of the motion curve may be changed is, as mentioned hereinbefore, to change the shape of the curves 25 and 26 of Fig. 3, that is, to change the nature of movement of the magnet armatures. Each of these curves will be observed to consist of a relatively rapid rise from zero, a period of no movement at the end of the rise, during which the armature "hangs on" after being attracted; and this is followed by a rapid fall when the armature "lets go", and immediately subsequent to this the reaction of the springs carries the armature to the opposite side of a zero or neutral position and back again to the beginning of the second cycle. Of course, any change in the shape of this wave will effect a corresponding change in the motion curve. There are many factors entering into the shape of the curve and therefore many ways by which it may be modified. For example, if the magnetic circuit be worked at a higher flux density, or if a stronger magnet for the same spring strength or weaker springs for the same magnet be employed, the armature will "hang on" longer and the flat portion at the top of the pull curve in Fig. 3 will be of greater extent, and vice versa. Again, if the normal tension in the springs 7 and 8 and/or 14 and 15 be decreased for the same stroke by running the screws outwardly, the armature will correspondingly hang on longer and vice versa. Change of shape of the armature movement curve also will be effected by changing the length of the magnet air gap. Other and numerous alterations in the condition of the reaction springs and of the electro-magnet and the magnetic circuit thereof and the lateral resistance to bending of the bars 3 and 4 will occur to those skilled in this art which will have effects upon the shape of the armature movement curves 25 and 26.

Changing the amplitude of movement of the armatures will also change the shape of the curves 25—26 by changing the amount of compression of the springs and the amount of reactive throw thereof. The amplitude of the alternating current waves 21 and 22 will effect a change in the shape of the curves 25 and 26. If the amplitude be increased, the flat portion at the top of the motion curve 25 or 26 will be increased in extent; and if the amplitude of the alternating current be decreased, likewise the flat portion of the curve may be decreased in extent or entirely eliminated, producing a more nearly sine form for the curves 25 and 26.

It is one of the advantages of my invention that the shape of the motion curve may be changed while the motion is going on. This advantage will become more apparent when an actual embodiment of my invention is described applied to practical purposes. To change the motion curve while in action, the screws 206—206 or 209—209 in connection with the armature 10 and the corresponding screws in connection with the armature 16 may be turned to vary the tension of their corresponding springs to change the shape of the curves 25 and 26. Similarly, the amplitude of the alternating current waves 21 and 22 may be changed while the apparatus is in operation; this may be effected either at the generator by varying its field strength, or by series rheostats such as those illustrated at 312 and 313, Fig. 1; and the effect of thus adjusting the springs and/or the amplitude of the alternating current to change the shape of the motion curves such as the curve of Fig. 2, has been described above.

In Figs. 21 and 22 I have illustrated diagrammatically one illustrative result of changing the amplitude of the alternating current and the tension of the springs above referred to; and to make the illustration still more general, having included therein a change of phase relation of the alternating current waves.

In Fig. 21, the alternating current wave 400 which corresponds to the wave 21 of Fig. 3 is illustrated as of about the same amplitude as in that figure. The wave 401, however, which corresponds to the wave 22 of Fig. 3, is of lower amplitude and is disposed 45° ahead of the wave 400 in phase. The motion curve 402, corresponding to the curve 25 of Fig. 3, is substantially the same as the latter by reason both of the amplitude of the wave 400 being unchanged and the spring tension of the springs 7—7 and 8—8 remaining unchanged. The motion curve 403, however, corresponding to the curve 26 of Fig. 3, differs considerably from the latter, not only in regard to its phase relation but amplitude also. This wave is produced by energizing the magnet 17 with current according to the wave 401 and also by weakening the tension of the springs 14—14 and 15—15 and shortening the gap between the transverse frame element 6 and the stops 19—19.

The curve of Fig. 22 illustrates the movement effected jointly by the curves of movement 402 and 403, this curve being produced in a manner similar to that described hereinbefore in connection with Figs. 2 and 4 to 8 inclusive.

It will be appreciated that the adjustment of the amplitude of the alternating current waves and the adjustment of the spring tension may be made while the apparatus is operating and producing the motion.

It is believed that the nature and cause of variations in the motion curves, Figs. 2, 4, 5, 6, 7, 8 and 22 and the like, which may thus be produced, will now be understood by those skilled in the art without herein going into the almost limitless detail consideration thereof.

On the other hand, however, changes which may be effected in the armature movement curves 25 and 26 by changes in the energizing magnet current may here be briefly considered. The current waves 21 and 22 of Fig. 3 are of sine form. Preferably these two waves are generated by independent single phase generators 50 and 51 diagrammatically illustrated in Fig. 1, driven in unison through a coupling 52. By means of the coupling, the phase angle of the two currents may be varied as will be understood by those skilled in the art, to effect the variations of phase displacement above discussed. Additionally, however, the shape of the generated wave may be varied to differ from a sine wave to any desired extent within limits to effect substantially any desired change in the shape of the armature action curves 25 and 26.

Thus the motion curves of Figs. 2, 4, 5, 6, 7, 8, and 22 may, by the employment of suitable energizing current wave forms, be further modified, for example to render them more nearly symmetrical. For example, Fig. 6 may be thus made to conform more nearly to a true triangle, Fig. 7 more nearly to a perfect circle and Fig. 8 more nearly to a true ellipse.

Where the generators 50 and 51 supply electric current especially to energize the windings 12 and 18, they may be driven at the desired frequency to effect a suitable frequency for the movement curves above described; and the frequency of the movement may be suitably varied by varying the speed at which the generators 50 and 51 are driven, for example by changing the speed at which a prime mover drives the shaft 53 through a pulley 54 by a belt 55.

However, where it is desired to use commercial alternating current as the source of electrical energy, the frequency, such for example as 60 cycles per second, may not be suitable. In such instances, I may employ the modulating system and apparatus shown and described in my Patent No. 1,964,265, June 26, 1934. By this means and method, an alternating current supply at any commercial frequency may be modulated and employed to energize the windings 12 and 18 at any desired lower or higher frequency to produce armature action curves 25 and 26 or of any desired modified form thereof.

In the foregoing it has been considered that the magnets 11 and 17 are alike, preferably identical as to construction and action, and that they produce like or identical curves 25, 26. It will now be apparent that the magnets 11 and 17 need not be identical and need not be energized by identical current waves; and that therefore the armature action curves 25 and 26 may be made to differ from each other in any desired respects to cause any corresponding desired further changes in the movement curves such as illustrated for example in Figs. 2, 4, 5, 6, 7, 8 and 22.

The variations of the motion curves hereinbefore discussed have been variations in the form thereof and in the rotated position in space. Where the invention is applied to a practical purpose, such for example as to move a material-handling screen, it will be understood that some if not all motions of the screen will move with a movement corresponding to that of one or another of the motion curves herein; for example, the curve of Fig. 6. That is to say, the screen will be elevated along the right-hand portion of the curve and then will move toward the left horizontally and then downwardly toward the right. It will be apparent that the effect upon the material on the screen will be different if the movement is reversed in direction, that is to say, if the screen is moved upwardly toward the left and then toward the right horizontally and then downwardly vertically.

Thus, in general, the effects on an article or an element of apparatus to be cyclically moved may be different whether the movement around the motion curve is clockwise or counter-clockwise. Movement in either direction may be selectively employed by preselectively determining which one of the magnets, for example the magnets 11 and 17 of Fig. 1, is energized by the current wave 22 and which by the current wave 21.

As illustrated in Fig. 5, in connection with Fig. 1, it is contemplated to vary the shape of the movement curve by disposing at an obtuse angle the lines of direction on which the magnets act. Obviously, the limit of this angle is 180°. My invention contemplates the employment of magnets operating at angles of 180°. In such instances the lines of action are disposed parallel to each other and each magnet effects movement of a characteristic point in a mass to be moved, and the two points thus considered determine a line. Inasmuch as the resultant motion is the motion of a line instead of the motion of a point, a different method of graphical representation is employed as hereinafter shown.

Referring to Fig. 9, I have illustrated diagrammatically an apparatus which may be employed when the lines of action of the two magnets are parallel. In this diagram, the lines are not only parallel but the magnets act in opposite directions, that is, the angle between the lines of action is 180°.

A bar or frame element 60 is supported at its opposite ends between pairs of springs 61, 62 and 63, 64, the springs abutting at one end upon the frame element 60 and at the opposite end upon heads 315 on adjusting screws 316 in stationary frame members 317 and 318. The bar has adjacent each end and on opposite sides thereof, armatures 66 and 67 affixed thereto. Magnets 68 and 69 energized by windings 70 and 71 are mounted opposite the armatures to attract the same. Stops 72 and 73 are provided to limit the movement of the armatures in the direction of the magnets.

At 80 and 81 are indicated points, which move under the influence of their respective magnets and adjacent springs, and the points determine a line 82.

By the concurrent energization of the magnet windings 70 and 71, in selected phase relation, the points 80 and 81 and therefore the line 82 will follow a predetermined cycle of movement. The windings 70 and 71 may be energized by the currents 21 and 22 of Fig. 3, and the armatures 66 and 67 may follow respectively the armature movement curves 25 and 26 of Fig. 3. The movement path of the line 82 and therefore of the bar 60 when the magnets are energized as in Fig. 3, is illustrated in Fig. 10. The magnet armature curve 25 taken from Fig. 3 indicates, by the ordinates thereof, the movement of the point 80 in vertical directions toward and from the magnet 68, during the passage of time as indicated by the abscissae. The curve 26, also taken from Fig. 3, indicates the concurrent movement of point 81 by the magnet 69, the magnets being energized by waves of current 90° apart in phase, as in Fig. 3. The curves 25 and 26 of Fig. 11 are drawn to a smaller scale than in Fig. 3.

The reference characters $a$ to $l$ indicate the successive positions of the line 82 as it moves with a cyclical movement in a vertical plane, the plane of the paper, the successive positions being for successive equal intervals of time.

In Fig. 11 is illustrated the movement of the line 82 and bar 60 when the energizing currents of the two magnets and therefore the armature curves of action 25 and 26 of Fig. 3 are 45° apart in phase instead of 90° as in Fig. 10. In Fig. 11, as in Fig. 10, the successive reference characters $a$ to $l$ indicate the successive positions for equal intervals of time of the line 82.

In Fig. 12 I have illustrated a diagrammatic apparatus similar to Fig. 9 in every respect except that the two magnets 68 and 69 together with their armatures 66 and 67 are disposed on the same side of the frame element 60; in other words, the lines of pull are 360° apart instead of 180° as in Fig. 9.

In Fig. 13 is illustrated, in a manner similar to that of Fig. 10, the movement of the line 82 and bar 60 when the magnets 68 and 69 of Fig. 12 are energized with currents 90° apart in phase as in Fig. 3, effecting armature movement according to the curves 25 and 26. In Fig. 14 is similarly illustrated the movements of the line 82 and bar 60 when the magnets of Fig. 12 are energized 45° apart in phase by armature movement curves 25 and 26 of Fig. 3.

In each of the curves 13 and 14, the reference characters $a$ to $l$ inclusive indicate successive positions of the line 82 for equal intervals of time.

Obviously, the cyclical movements illustrated in Figs. 10, 11, 13 and 14 are subject to the same possible modifications hereinbefore referred to resulting from a change of phase angle, a change of energizing wave shape, changes in the magnets, etc. etc.

From the foregoing, it will now appear that the principles of my invention are susceptible of producing cyclical movements of an almost infinite variety. The foregoing descriptions explain its theoretical application to the movement of a single point (in connection with Figs. 1, 2, 4, 5, 6, 7, 8 and 22) or the movement of a line by the movement of two points (in connection with Figs. 10, 11, 13 and 14); and it is believed to be clear without further illustration or description that a third electromagnet and armature energized to define an armature movement at an angle to the plane of the paper illustrating the embodiments of my invention, could be employed to modify the movement curves hereinbefore described and illustrated to render the same three-dimensional. Again, even in a single plane, it will be understood that the cyclical movement paths of other points in the mass 1 such as the points 84 or 85, Fig. 1, and intermediate points such as the point 83 in the lines 82 of Fig. 9 and Fig. 12 may have derived movements of the same order as those illustrated but differing therefrom.

Therefore, while it is physically impossible to illustrate and describe all of the possible forms of apparatus and different orders of cyclical movements produced thereby, it will be clear from the foregoing what the essential elements of my invention are to produce any such movements.

In Figs. 15 to 17 inclusive is illustrated an apparatus whereby the principles of my invention may be applied in one form to cyclically move or vibrate the screen of a material-handling screening apparatus.

The main frame of the apparatus comprises a pair of laterally spaced parallel channels 98—98 disposed in an inclined position as shown in Fig. 15 and a transverse end channel 99 rigidly connected thereto as by welding.

By means of channel members 97 parallel to the channels 98, end channel members 101 and 102 and side plates 103 and 104, a pair of boxlike chambers 105—105 is provided superimposed upon and coextensive with the main channels 98.

A pair of rectangular box-form housings 106 and 107 comprising each a rectangular frame formed from channels 108, 109, 110 and 111, extend transversely of the frame, being supported upon the box-like housings 105—105.

A screen frame is disposed between the housings 105—105 and comprises a pair of parallel laterally spaced angle irons 85, extending generally parallel to the main channels 98, and comprises transverse end angles 86—86. A rectangular piece of screen mesh 87 is secured to the frame thus formed. Side boards of sheet metal 88—88 are provided on the angles 85—85 to prevent material on the screen from moving laterally therefrom.

Thus material placed upon the screen at its upper end as viewed in Fig. 15 may move thereover when the screen is vibrated in a manner to be described for the usual purposes.

Secured to the angles 85—85 are longitudinally spaced stirrups 89—89. Upwardly extending rods 90—90 have at their lower ends enlarged heads 91 and reduced diameter shanks extending therefrom. The shanks are adapted to be projected through suitable perforations in the stirrups 89 and nuts 93 are threaded on the shanks whereby the heads 91 are clamped to the stirrups to rigidly connect the lower ends of the rods 90 to the stirrups. There are thus provided four rods 90, two on each side of the screen frame and the rods 90 extending upwardly into the box-like housings 106 and 107 through suitable perforations 113—113 in the webs of the channels 111 of the housings.

A channel 95 extends longitudinally in each of the housings 106 and 107 and the upper ends of the rods 90 are rigidly secured to the webs 94 thereof in a manner similar to that for securing their lower ends to the stirrups 89.

A pair of lower springs 114—114 abut at their upper ends on the undersides of the webs 94 of each channel 95 and at their lower ends abut upon the web of the channel 111 of the housings 106 and 107. A similar pair of springs 115—115 abut at their lower ends upon the upper side of the channel webs 94 and at their upper ends abut upon a head 116 forming part of an adjusting device for adjusting the compression tension of the springs. The adjusting device comprises, besides the head 116, a screw 117 having a handle 118 for rotatably adjusting it and a nut device 119 on the housing.

The head device 116 may have arms 120 partly embracing the upper end of the spring 115 and similar arms 121 and 122 may be provided on the channel web 94 to embrace the lower end thereof and arms 122 may be provided on the channel 111 for the lower end of the spring 114 to center the springs in their predetermined positions, and to prevent their shifting laterally therefrom.

At 125 is a third box-like housing formed from channels 126, 127—127 and 128 disposed transversely of and secured across the upper end of the main frame. A channel 129 extends longitudinally of the housing 125 and an inner pair of springs 130—130 abut at their opposite ends upon the webs of the channels 128 and 129. A corresponding outer pair of springs 131—131 abut at their opposite ends upon the web of the channel 129 and upon heads 132 of adjusting devices having screws 134 and adjusting wheels 133 similar to those already described.

A pair of rods 135—135 extend through suitable perforations 136 in the web of the channel 128 and are rigidly secured at their outer ends to the web of the channel 129, and at their inner ends are rigidly secured to brackets 137—137 on the side angles 85 of the screen, the securing means for the ends of the rods 135 being similar to that already described for the rods 90.

By the construction thus far described, it will be apparent that the screen frame 85—86 and the screen 87 thereon is suspended in position by the rods 90—90 and the rods 135—135, the rods in turn being supported upon springs 114—114 and 130—130, respectively.

An E-shaped magnet core 140 is secured to and projected inwardly from the outer channel 126 and is provided with a winding 141 on the central limb of the core. An armature 142 is secured to the web of the channel 129 at a point preferably midway between the points of attachment thereto of the rods 135—135. Suitable stops 143—143 are secured to the web of the channel 129 and cooperate with removable renewable stops 144—144 secured to the channel 126.

A similar magnet core 145 and winding 146 are provided on the upper channel 108 of the housing 106 cooperating with an armature 147 on the web of the channel 95 midway between the rods 90—90 and stops 148—148 and 149—149 respectively on the channel 95 and the channel 108, are provided similar to the corresponding parts above described for the housing 125.

Another set comprising an armature magnet and stops is provided in the housing 107 which may be similar to or identical with that just described for the housing 106, cooperating with the channel 95 therein.

The electro-magnetic windings 146 in the housings 106 and 107 and the winding 141 are intended to be energized with current following the waves 21 and 22 of Fig. 3 respectively, but preferably with the waves 21 and 22 45° apart in phase instead of 90° as illustrated in Fig. 3. The motion curves of the armatures 147 and 142 will therefore be, respectively, the motion curves 25 and 26 of Fig. 3 but spaced apart 45° in phase.

The movements of the armatures 147 and 142 are communicated, respectively, to the channels 95 and 129 and thence to the screen frame 85—86—87 through the rods 90 and 135, respectively. These rods are preferably made from spring steel alloy and are stiff enough to transmit the longitudinal thrusts from the armature-operated channels to the screen frame, and are flexible enough to resiliently yield laterally, the rods 135 yielding laterally upon movement of the screen by the rods 90 and the rods 90 moving laterally upon movement of the screen by the rods 135.

As will now be clear, the screen will move to follow the concurrent movements of the armatures 147 and 142 which follow the motion curves 25 and 26 spaced 45° apart in phase and in association with the alternate compression and expansion of the springs above and below the channels to which the rods are attached, the principle of movement of the screen being substantially the same as that for the movement of the point 2 in the diagrammatic apparatus of Fig. 1 hereinbefore completely described.

In Fig. 18 is illustrated, greatly magnified, the path of movement of a point in the screen 87. The axis 150 is in the direction of the rods 90, and the axis 151 in the direction of the rods 135, the point 2 being a point in the screen at the position it assumes when the parts are at rest and the magnets de-energized.

Values in the curve 152 of Fig. 18 parallel to the axis 150 are taken from the curve 25 of Fig. 3 to a reduced scale, and values parallel to the axis 151 are the corresponding instantaneous values taken from the curve 26 of Fig. 3 but displaced only 45° from the curve 25 instead of 90° as shown in Fig. 3.

The magnet windings 146 and 141 are energized by the two-phase alternating currents 21—22 in such respective relation that the movement of the point 2 of the screen is around the curve 152 in the clockwise direction inasmuch as this movement of the screen gives a superior material screening effect. Obviously, the screen could be moved in the opposite or counterclockwise direction if desired.

The curve 152 of Fig. 18 has been described as for a single point in the screen 87 but it will of course be understood that all points thereof have this same movement; that is, the screen as a whole has this movement.

It has been found that a screen for screening material will operate efficiently and keep itself clean, that is, keep the mesh from clogging if it is given a combined longitudinal movement and a movement at right angles thereto. Such a movement is provided by the curve of Fig. 18. Obviously, such a movement also is provided by the curve of Fig. 2, and it will now be apparent that the screen above described may be made to operate according to the curve of Fig. 2 merely by energizing the magnets 146 and 141 with alternating sine wave currents 90° apart in phase instead of 45°.

In cases where the screen frame and screen 85—86—87 is of great weight, it may be desirable so to counterbalance this weight that vibrations of the screen and frame will not be transmitted to the stationary part of the frame and thence to the floor or the like of the building in which it is installed.

In each of the housings 105 is provided a knife edge bearing construction 211, preferably supported upon the channel 96, upon which is rockingly mounted, and at an intermediate portion thereof, a rocker arm 210 upon one end portion of which is disposed a counterbalance weight 212. On the opposite end portion of the arm 210 and on the other side of the bearing 211, the rocker arm 210 has rigidly secured thereto as at 213 a resilient steel rod 214, the upper end of which (see Fig. 16) is rigidly secured as at 215 to the channel 95. As will be apparent, the weight 212, acting through the arm 210 and the rod 214, exerts a generally upward thrust on the channel 95 which carries the screen, and thus the weight of the screen is counterbalanced in the direction of the rods 90.

Similarly, a knife edge bearing construction 216 is provided upon a suitable frame member 217 in each of the housings 105, see Fig. 15, and rockingly supports a generally vertically disposed rocker arm 218 which extends upwardly out of the housing 105 and into a supplemental housing 219 and in the latter housing carries a counterbalance weight 220. Below the knife edge bearing 216 there is secured to the rocker arm 218 a resilient steel rod 221, rigidly connected at one end to the rocker arm 218 as at 222 and at its opposite end as at 223 rigidly connected to the channel 129. Thus the weight of the screen and its frame, tending to move the screen in the direction of the rods 135, is counter-balanced by the weight 220 acting through the rods 221.

By means of the knife edge bearing construction described, the weight may vibrate back and forth in the opposite direction to the vibratory movements of the screen and the weight of the latter at all times be counter-balanced by the weights.

It is believed that it will now be appreciated that if the amplitude of movement of the magnets be changed by adjusting movement of the screws 117—117 and/or 134—134, or if the amplitude of the alternating current waves be adjustably changed, the shape of the curve 152 of Fig. 18 and therefore the nature of the vibratory movement of the screen may be changed in a manner set forth hereinbefore; and that this may be highly desirable to effect the most efficient screening of material on the screen. It is to be particularly noted that these changes may be made while the screen is in vibratory movement and the effects upon the material may be observed and the most efficient effects produced. These changes may be made by substantially infinitestimal steps if desired and over a wide range.

Of course, in this connection it will be understood that any suitable means well known in the art may be provided to change the phase relationship of the two alternating current energizing waves; and thus in addition to changing the curve 152 of Fig. 18 by changing the shape of the armature movement curves 25 and 26 as just referred to, the general order of the curve may be changed to cause it to conform selectively to such curves as those illustrated in Figs. 6, 7 and 8. Such phase shifting means may be provided adjustable while the generator is generating its current waves. Thus, as will appear, the shape of the motion curve for the screen, while in vibratory motion, may be varied almost infinitely to adapt it most efficiently to the material being handled.

In this connection it may be observed that any form of alternating current generator may be utilized to supply the current waves to the magnets, such for example as an electron tube generator, electro-magnetic induction generator etc.

As illustrative of the application of some of the other curves of motion herein described to the screening of material, reference may be had again to Fig. 2. If the drawing be rotated in the plane of the paper to bring the diagrammatic represented screen section 320 above the curve of motion and with the screen section 320 horizontal, the figure will represent a suitable set of screening conditions, the view being considered as taken from the plane X—X of Fig. 17. The material being screened will not only move longitudinally over the screen because of its inclination, but will be thrown from side to side of the screen but at the same time prevented from leaving the screen laterally by the inwardly directed movement given to the material by the lateral wings of the motion curve.

Again, the movements of Figs. 10, 11, 13 and 14 may be applied to screens. By suitable disposition of parts which it is believed will now be apparent, Figs. 10 and 11 may be considered as illustrating successive positions of a screen such as that illustrated in Figs. 15 to 17 and viewed from the side as in Fig. 15. Figs. 13 and 14 may be considered as representing the movement of such a screen when viewed from the plane X—X of Fig. 17.

It has been stated hereinbefore that the motion curves 25 and 26 of Fig. 3 may be given different configurations at will by resort to various expedients. If, in this manner, these motion curves be converted into true sine curves, then, if the directions of pull of the magnets be maintained at 90° with each other, the resultant motion curves of the point 2 will be a true circle or a true ellipse, or a straight line, depending upon the phase relationship and the amplitude of the motion waves. It is believed that the addition and subtraction of harmonic waves at different phase displacement and of different amplitudes is so well understood that it need not be illustrated and described further herein.

In the practical application of my invention to screening material, and in the form thereof of Figs. 15 to 17, the rod elements connected at one end to the screen moving members and at the other end to the motive power means, have rigid connections at said opposite ends and are intermediately flexible or resilient. The movement thus is in general a hinging movement. In some cases it may be desired to employ a more ordinary form of hinging connection, and then the hinging connection of Figs. 19 and 20 may be employed. Fig. 19 represents a modification of hinging connection which may be applied to the screen of Fig. 15 to connect the channel 94, rocking lever arm 210 and frame channel 98, a rod 214' being employed in place of the rod 214 of Fig. 15 and the other elements bearing the reference characters of Fig. 15.

A hinging joint connection is employed at 300 and at 301 respectively between the opposite ends of the rod 214' and the channel 94 and the bar 210. A generally similar hinging connection at 302 is employed between the bar 210 and the frame channel 98. These connections may be of the ordinary hinge pintle type but preferably, because of the high periodicity of the vibration transmitted therethrough, I may employ a cushioned joint, one form of which is illustrated in Fig. 20, the view being taken approximately from the plane 22—22 of Fig. 19.

Referring to Fig. 20, the rod 214' has an eye 303 at its lower end, a pintle pin or bolt 304 is projected therethrough and is surrounded by a bushing of rubber or like cushioning material 305 enclosed within a bore in a bearing element 306, the latter being secured upon the upper side of the channel-form rocking arm 210. The upper end of the rod 214' may be secured to the channel 94 by a similar or identical construction. The rocking lever 210 has secured to the underside thereof a forked bearing element 307, and a bearing pin 308 extends therethrough surrounded by a rubber or like cushioning bushing 309 disposed in a bore in a bearing member 340 secured upon the upper side of the channel 98.

The screen movements will be the same whether the connections are the rigid resilient connections or the oscillating pivot connections just described. The exact construction of the pivot connections of Figs. 19 and 20 is immaterial. If desired, the pivot connection employed at the shackles of automobile springs may be utilized wherein no sliding or relatively rotary engagement of parts is present, the relative movement taking place in the rubber or like bushings.

In the foregoing description, I have described my invention as being applied to a material handling screen to vibrate the same. As stated hereinbefore this use of my invention is merely illustrative and my invention is not limited thereto, and may be applied with equal usefulness and efficiency to other uses. For example, it may be desirable in some of the arts, to move or convey material on a conveyer element having such movement as that described hereinbefore for the screen of the specific embodiment of Figs. 15 to 20 inclusive. An apparatus embodying my invention for this purpose might be constructed substantially the same as that of Figs. 15 to 20 inclusive, but with a solid plate or the like substituted for the screen of those figures, and with said plate or the like disposed at a suitable angle to the horizontal so that material thereon, during the vibrations of the plate, would progressively move thereover in one direction or the other.

Again, in some of the arts, it is desirable to vibrate a mass of material of different kinds or of different sizes, shapes, etc., to stratify the same. My invention may be applied to such uses and an illustrative embodiment thereof would be similar to that of Figs. 15 to 20 inclusive, but with a sheet or plate substituted for the screen of those figures, and preferably disposed horizontally.

Because of the complete description herein of my invention as applied to a screen, it is believed not to be necessary to further describe or illustrate such other uses.

Furthermore, my invention is not limited to the exact details of construction shown and described hereinbefore, in the illustrative embodiment. Many changes and modifications may be made therein but within the spirit of my invention, and without sacrificing its advantages and within the scope of the appended claims.

Subject matter illustrated and described herein but not claimed is being claimed in my co-pending application, Serial Number 171,252, filed October 27, 1937.

I claim:

1. In a material screening vibratory apparatus, a screen frame, means supporting the frame to be bodily movable in a plurality of angularly related rectilinear directions, a plurality of electrically actuable devices comprising each a movable element and being responsive to electric current undulating for correspondingly pulsatingly moving the movable element, supporting means for the devices disposing them to move the movable elements in different respective rectilinear directions, transmitting means for transmitting the pulsating movements of the movable elements to the frame to move it in said angularly related directions, the transmitting means comprising elongated flexible elements rigidly connected at spaced portions thereof to the movable elements and to the screen frame end permitting movement of the screen frame in all said directions, and electric circuits for the devices whereby they may be energized with a plurality of undulating electric currents in displaced phased relation.

2. An apparatus as described in claim 1 and in which the electrically actuable devices comprise each electro-magnetic means having an energizing winding and the movable element is a movable armature element, supported by resilient means whereby when the winding is energized with undulating current, the armature may be alternately attracted magnetically and retracted resiliently.

3. An apparatus as described in claim 1 and in which an electric generator is provided for supplying a plurality of undulating electric currents of displaced phase relation to the respective electrically actuable devices.

4. An apparatus as described in claim 1 and in which an electric generator is provided for supplying a plurality of electric alternating currents of displaced phase relation to the respective electrically actuable devices.

5. An apparatus as described in claim 1 and in which the elongated elements are rigidly connected to the screen frame for transmitting longitudinally thereto movement impulses of the movable elements and the flexibility of the elongated element permitting the elongated elements to bend upon movement of the screen frame by another device.

6. An apparatus as described in claim 1 and in which the elongated elements are rigidly connected to the movable elements and to the screen frame for transmitting longitudinally to the screen frame movement impulses of the movable elements and the flexibility of the elongated elements permitting the elongated elements to bend relative to the screen frame relative to the movable element upon movement of the screen frame by another device.

7. An apparatus as described in claim 1 and in which the undulating electric currents are supplied in alternating wave form.

8. In a motor for cyclically moving a load, a plurality of electrically actuable devices each comprising a pulsatingly movable element and each being responsive to electric current undulations for correspondingly pulsatingly moving the movable elements, supporting means for the devices disposing them to move the movable elements in different respective directions, transmitting means comprising rod-like elements rigidly connected to the load to be moved for transmitting longitudinally to the load movement impulses of said movable elements and adapted to bend laterally upon movement of the load by another device, and electric circuits for the devices whereby they may be energized with a corresponding plurality of undulating electric currents in displaced phase relation.

9. In a motor for cyclically moving a load, a plurality of electrically actuable devices responsive to electric current undulations for producing corresponding pulsating movements, the electrically actuable devices comprising each an electromagnetic winding and a stator and movable armature energizable thereby, the armature being supported upon resilient means whereby when the winding is energized with undulating electric current the armature may alternately be magnetically attracted and resiliently retracted, supporting means for the devices disposing them to exert their pulsating movements upon their armatures in different respective directions, transmitting means for transmitting the pulsating movements to a load to be moved, comprising a resilient rod-like element rigidly connected at opposite ends to an armature and to the load whereby movements of the armature may be transmitted longitudinally through the rod-like element to the load to pulsatingly move it and whereby the rod may bend laterally upon movement of the load by another of the devices, and electric circuits for the devices whereby they may be energized with a corresponding plurality of undulating electric currents in displaced phase relation.

10. In a motor for cyclically moving a load, a plurality of electrically actuable devices responsive to electric current undulations for producing corresponding pulsating movements, supporting means for the devices disposing them to exert their pulsating movements in a plurality of different respective directions, transmitting means for transmitting the pulsating movements to a load to be moved, the transmitting means permitting movement of the load in all said plurality of directions, whereby a portion of the load may move on a predetermined closed path of movement, and electric circuits for the devices whereby they may be energized with a corresponding plurality of undulating electric currents in displaced phase relation, and means for changing the shape of the movement path during pulsating movement.

11. In an apparatus for cyclically moving a load, resilient means for supporting the load to permit natural periodic universal movement thereof, a plurality of electrically actuated devices comprising each a movable element and being responsive to electric current undulations for producing corresponding pulsating movements of the movable elements, supporting means for the devices disposing them to produce the said pulsating movements in a plurality of different rectilinear directions, transmitting means for transmitting said pulsating movements from the movable elements to the load to effect corresponding vibratory movements thereof in corresponding different directions, and electric circuits for the devices whereby they may be energized with a corresponding plurality of undulating electric currents in displaced phase relation, the transmitting means comprising resilient elongated elements rigidly connected at one end to the load and at the other end to the movable elements of the devices.

12. In a motor for cyclically moving a load, a plurality of electrically actuable devices comprising each an electromagnetic winding and a stator and a movable armature energizable thereby, the armature being supported upon resilient means whereby when the winding is energized with undulating electric current the armature may alternately be magnetically attracted and resiliently retracted, supporting means for the devices disposing them to exert said pulsating movements on the armatures in different respective directions, transmitting means for transmitting pulsating movements of the armatures to the load to be moved comprising elements connected to the armatures and to the load whereby movements of the armatures may be transmitted in one direction through the connecting element to the load to pulsatingly move it, and the connecting elements being hingedly movable relative to the armatures and to the load whereby the load may be concurrently moved in another direction by another of the devices, and electric circuits for the devices whereby they may be energized with a corresponding plurality of undulating electric currents in displaced phase relation.

13. In a motor for cyclically moving a load, a plurality of electrically actuable devices responsive to electric current undulations for producing corresponding pulsating movements, supporting means for the devices disposing them to exert their pulsating movements in different respective directions, transmitting means for transmitting the pulsating movements to a load to be moved, the transmitting means permitting movement of the load in all said plurality of directions, and electric circuits for the devices whereby they may be energized with a corresponding plurality of undulating electric currents in displaced phase relation whereby a portion of the load may be moved on a predetermined closed path of movement, and means for adjustably changing the shape of the movement path during movement.

14. In a motor for cyclically moving a load, a plurality of electrically actuable devices responsive to electric current undulations for producing corresponding pulsating movements, supporting means for the devices disposing them to exert their pulsating movements in different respective directions, transmitting means for transmitting the pulsating movements to a load to be moved, the transmitting means permitting movement of the load in all said plurality of directions, and electric circuits for the devices whereby they may be energized with a corresponding plurality of undulating electric currents in displaced phase relation whereby a portion of the load may be moved on a predetermined closed path of movement, and means for adjustably changing the amplitude of the pulsating movement of some of the devices to change the shape of the movement path during movement.

15. In a motor for cyclically moving a load, a plurality of electrically actuable devices responsive to electric current undulations for producing corresponding pulsating movements, supporting means for the devices disposing them to exert their pulsating movements in different respective directions, transmitting means for transmitting the pulsating movements to a load to be moved, the transmitting means permitting movement of the load in all said plurality of directions, and electric circuits for the devices whereby they may be energized with a corresponding plurality of undulating electric currents in displaced phase relation whereby a portion of the load may be moved on a predetermined closed path of movement, and means for adjustably changing the phase relation of the electric currents to change the shape of the movement path during movement.

16. In a motor for cyclically moving a load, a plurality of electrically actuable devices responsive to electric current undulations for producing corresponding pulsating movements, rectilinear transmitting means comprising bendable elements rigidly connected to the load and to the devices for transmitting the pulsating movements to a load to move it in a plurality of different angularly related directions concurrently, and electric circuits for the devices whereby they may be energized with a corresponding plurality of undulating electric currents in displaced phase relation, and stop means for periodically abruptly stopping pulsating movement of the load in each of said plurality of directions of pulsating movement.

17. In a vibratory apparatus, a supporting frame, a load element supported on the frame to move in a plurality of directions, electrically actuable means responsive to periodic electric currents in displaced phase relation for pulsatingly moving the load element in said plurality of directions in time spaced relation to cause a portion of the load element to move in a closed path of movement, and means for neutralizing kinetic energy of the moving load element.

18. In a vibratory apparatus, a supporting frame, a load element supported on the frame to move in a plurality of directions, electrically actuable means responsive to periodic electric currents in displaced phase relation for pulsatingly moving the load element in said plurality of directions in time spaced relation to cause a portion of the load element to move in a closed path of movement, and means for developing kinetic energy in opposition to the kinetic energy of the moving element.

19. In a vibratory apparatus, a supporting frame, a load element supported on the frame to move in a plurality of directions, electrically actuable means responsive to periodic electric currents in displaced phase relation for pulsatingly moving the load element in said plurality of directions in time spaced relation to cause a portion of the load element to move in a closed path of movement, and means for developing kinetic energy in opposition to the kinetic energy of the moving element in all said directions of movement.

20. In a vibratory apparatus, a supporting frame, a load element supported on the frame to move in a plurality of directions, electrically actuable means responsive to periodic electric currents in displaced phase relation for pulsatingly moving the load element in said plurality of directions in time spaced relation to cause a portion of the load element to move in a closed path of movement, and a secondary load element and means for moving it to develop kinetic energy therein in opposition to the kinetic energy of the first named moving load element to cause it to neutralize kinetic energy of the first named load element.

21. In a vibratory apparatus, a supporting frame, a load element supported on the frame to move in a plurality of directions, electrically actuable means responsive to periodic electric currents in displaced phase relation for pulsatingly moving the load element in said plurality of directions in time spaced relation to cause a portion of the load element to move in a closed path of movement, a plurality of secondary load elements and means for moving them in kinetic opposition to the said plurality of movements of the first named load element to cause them to neutralize kinetic energy of the first named load element.

22. In a motor for cyclically moving a load, a plurality of electrically actuable devices each comprising a pulsatingly movable element and each being responsive to electric current undulations for correspondingly pulsatingly moving the movable elements, supporting means for the devices disposing them to move the movable elements in different respective rectilinear directions, transmitting means comprising an elongated flexible element rigidly connected at one portion to a movable element and at another portion to the load to be moved for transmitting longitudinally to the load movement impulses of said movable elements and adapted to bend laterally upon movement of the load by another device, and electric circuits for the devices whereby they may be energized with a corresponding plurality of undulating electric currents in displaced phase relation.

23. In a vibratory material handling screen mechanism, a main support, a screen supporting frame and mass means having predetermined inertia, resilient means movably supporting the frame and mass means on the support, and permitting the frame to move in a plurality of directions defining a closed path of movement, mechanical means connecting the screen frame and mass means constraining them to move in predetermined relative directions whereby inertia of the frame opposes inertia of the mass means, and electromagnetic means and a source of undulating electric current therefor for exerting periodic tractive efforts on the frame and mass means to vibrate them on the resilient support.

24. In a vibratory material handling screen mechanism, a main support, a screen supporting frame and mass means having predetermined inertia, resilient means movably supporting the frame and mass means on the support and permitting the screen frame to move in a plurality of directions defining a closed path of movement, means for causing the screen frame and mass means to move in predetermined relative directions whereby inertia of the screen opposes inertia of the mass means, and electromagnetic means and a source of undulating electric current therefor for exerting periodic tractive efforts on the frame and mass means to vibrate them on the resilient support.

25. In a vibratory material handling screen mechanism, a main support, a screen supporting frame and mass means having predetermined inertia, resilient means movably supporting the frame and mass means on the support, and permitting the screen frame to move in a plurality of rectilinear directions, mechanical means connecting the screen frame and mass means constraining them to move in predetermined relative directions whereby inertia of the screen opposes inertia of the mass means, and electromagnetic means and a source of undulating electric current for exerting periodic tractive efforts on the frame and mass means to vibrate them on the resilient support.

26. In a vibratory material handling screen mechanism, a main support, a screen supporting frame and mass means having predetermined inertia, resilient means movably supporting the screen frame and mass means on the support, and permitting the screen frame to move in a plurality of rectilinear directions, means for causing the screen frame and mass means to move in predetermined relative directions whereby inertia of the screen opposes inertia of the mass means, and electromagnetic means and a source of undulating electric current for exerting periodic tractive efforts on the frame and mass means to vibrate them on the resilient support.

27. In a vibratory apparatus, a supporting frame, a load element supported on the frame to move in a plurality of directions, means comprising a plurality of electro-magnets having movable portions arranged to transmit their movements to the load element and having windings energized with undulating electric currents for moving the load element in said plurality of directions with pulsating movements in time spaced relation to cause a portion of the load element to move in a closed path of movement, and means for neutralizing kinetic energy of the moving load element.

28. In a vibratory apparatus, a supporting frame, a load element supported on the frame to move in a plurality of directions, means comprising a plurality of electro-magnets having movable portions arranged to transmit their movements to the load element and having windings energized with undulating electric currents for moving the load element in said plurality of directions with pulsating movements in time spaced relation to cause a portion of the load element to move in a closed path of movement, and means for developing kinetic energy in opposition to the kinetic energy of the moving element.

29. In a vibratory apparatus, a supporting frame, a load element supported on the frame to move in a plurality of directions, means comprising a plurality of electro-magnets having movable portions arranged to transmit their movements to the load element and having windings energized with undulating electric currents for moving the load element in said plurality of directions with pulsating movements in time spaced relation to cause a portion of the load element to move in a closed path of movement, and means for developing kinetic energy in opposition to the kinetic energy of the moving element in all said directions of movement.

30. In a vibratory apparatus, a supporting frame, a load element supported on the frame to move in a plurality of directions, means comprising a plurality of electro-magnets having movable portions arranged to transmit their movements to the load element and having windings energized with undulating electric currents for moving the load element in said plurality of directions with pulsating movements in time spaced relation to cause a portion of the load element to move in a closed path of movement, and a secondary load element and means for moving it to develop kinetic energy therein in opposition to the kinetic energy of the first named moving load element to cause it to neutralize kinetic energy of the first named load element.

31. In a vibratory apparatus, a supporting frame, a load element supported on the frame to move in a plurality of directions, means comprising a plurality of electro-magnets having movable portions arranged to transmit their movements to the load element and having windings energized with undulating electric currents for moving the load element in said plurality of directions with pulsating movements in time spaced relation to cause a portion of the load element to move in a closed path of movement, a plurality of secondary load elements and means for moving them in kinetic opposition to the said plurality of movements of the first named load element to cause them to neutralize kinetic energy of the first named load element.

32. In a load vibrating apparatus, a main support, a load supporting frame and mass means having predetermined inertia, resilient means movably supporting the frame and mass means on the support, and permitting the frame to move in a plurality of directions defining a closed path of movement, mechanical means connecting the load frame and mass means constraining them to move in predetermined relative directions whereby inertia of the frame opposes inertia of the mass means, and means for exerting pulsatory tractive efforts on the frame and mass means to vibrate them on the resilient support comprising a plurality of electro-magnets having movable portions arranged to transmit their movements to the frame and mass and having windings energized with undulating electric currents.

33. In a load vibrating apparatus, a main support, a load supporting frame and mass means having predetermined inertia, resilient means movably supporting the frame and mass means on the support and permitting the frame to move in a plurality of directions defining a closed path of movement, means for constraining the load frame and mass means to move in predetermined relative directions whereby inertia of the frame opposes inertia of the mass means, and means for exerting pulsatory tractive efforts on the frame and mass means to vibrate them on the resilient support comprising a plurality of electro-magnets having movable portions arranged to transmit their movements to the frame and mass and having windings energized with undulating electric currents.

34. In a load vibrating apparatus, a main support, a load supporting frame and mass means having predetermined inertia, resilient means movably supporting the frame and mass means on the support, and permitting the frame to move in a plurality of rectilinear directions, mechanical means connecting the frame and mass means constraining them to move in predetermined relative directions whereby inertia of the frame opposes inertia of the mass means, and means for exerting pulsatory tractive efforts on the frame and mass means to vibrate them on the resilient support comprising a plurality of electro-magnets having movable portions arranged to transmit their movements to the frame and mass and having windings energized with undulating electric currents.

35. In a load vibrating apparatus, a main support, a load supporting frame and mass means having predetermined inertia, resilient means movably supporting the frame and mass means on the support, and permitting the frame to move in a plurality of rectilinear directions, means for constraining the frame and mass means to move in predetermined relative directions whereby inertia of the frame opposes inertia of the mass means, and means for exerting pulsatory tractive efforts on the frame and mass means to vibrate them on the resilient support comprising a plurality of electro-magnets having movable portions arranged to transmit their movements to the frame and mass and having windings energized with undulating electric currents.

36. In a vibratory material handling screen mechanism, a main support, a screen supporting frame and mass means having predetermined inertia, resilient means movably supporting the frame and mass means on the support, and permitting the frame to move in a plurality of directions defining a closed path of movement, mechanical means connecting the screen frame and mass means constraining them to move in predetermined relative directions whereby inertia of the frame opposes inertia of the mass means, and electro-responsive means and a source of undulating electric current therefor for exerting pulsatory tractive efforts on the frame and mass means to vibrate them on the resilient support.

37. In a vibratory material handling screen mechanism, a main support, a screen supporting frame and mass means having predetermined inertia, resilient means movably supporting the frame and mass means on the support, and permitting the frame to move in a plurality of directions defining a closed path of movement, mechanical means connecting the screen frame and mass means constraining them to move in generally opposite rectilinear directions whereby inertia of the frame opposes inertia of the mass means, and electro-responsive means and a source of undulating electric current therefor for exerting pulsatory tractive efforts on the frame and mass means to vibrate them on the resilient support.

38. In an apparatus for cyclically moving a load, resilient means for supporting the load to permit natural periodic movement thereof in a plurality of different directions, a plurality of movable elements, means comprising a source of undulating electric current and a plurality of electro-magnets energized thereby, having movable portions arranged to transmit their movement to the movable elements for moving the movable elements with pulsating movements, supporting means for the movable elements disposing them to transmit the said pulsating movements in a plurality of different directions, transmitting means between each movable element and the load comprising flexible elements rigidly connected to the moving elements and to the load for transmitting said pulsating movements from the movable elements to the load to effect corresponding vibratory movements thereof in corresponding different directions.

39. In a motor for cyclically moving a load, a plurality of electrically actuable devices responsive to electric current undulations for producing corresponding pulsating rectilinear movements, transmitting means comprising bendable elements rigidly connected to the load and to the devices for transmitting the pulsating movements to a load to move it in a plurality of different angularly related directions concurrently and electric circuits for the devices whereby they may be energized with a corresponding plurality of undulating electric currents in displaced phase relation, and stop means for periodically abruptly stopping pulsating movement of the load.

40. In an apparatus for cyclically moving a load, resilient means for supporting the load to normally permit universal movement thereof, a plurality of devices comprising each a movable element, means for pulsatingly moving the movable elements comprising electro-magnets having armatures arranged to transmit their movements to the movable elements and having windings energized with undulating electric currents, supporting means for the devices disposing them to direct the said pulsating movements in a plurality of predetermined rectilinear directions, transmitting means comprising bendable elongated elements rigidly connected to the movable elements and to the load for transmitting said pulsating movements from the movable elements to the load to effect corresponding vibratory movements thereof in corresponding directions.

41. In an apparatus for cyclically moving a load, resilient means for supporting the load to permit natural periodic movement of portions thereof in predetermined directions, a plurality of devices comprising each a movable element, means for pulsatingly moving the movable elements and comprising electro-magnets having movable portions arranged to transmit their movements to the movable elements and having windings energized with undulating electric currents, supporting means for the devices disposing them to direct the said pulsating movements in a plurality of predetermined rectilinear directions, transmitting means comprising resilient bendable elongated elements rigidly connected at opposite end portions to the movable elements and to the load for transmitting said pulsating movements from the movable elements to the load to effect corresponding vibratory movements thereof in corresponding directions, and stop means for periodically abruptly stopping movement of the load.

42. In a material screening apparatus, a main frame, an elongated screen frame supporting a screen of perforated material in substantially a plane inclined to the horizontal, the screen frame being supported upon springs on the main frame to move concurrently longitudinally in the general direction of the screen plane and in directions at an angle thereto, a device spaced from the plane of the screen and comprising an electro-magnet having an energizing field element and an armature element, one of which is movable and the other of which is stationarily supported on the main frame, a connection between the movable magnet element and the screen frame comprising an elongated flexible element having a rigid connection at one end with the screen frame and at the other end having a rigid connection with the movable magnet element, and extending at an angle to the screen plane, another device comprising an electro-magnet having an energizing field element and an armature element, one of which is movable and the other of which is stationarily supported on the main frame, a connection between the movable magnet element of the said other device and the screen frame comprising an elongated flexible element having a rigid connection at one end with the screen frame and at the other end having a rigid connection with the movable magnet element of the said other device and extending generally in the direction of the screen plane, the said elongated elements being disposed at an angle to each other, the parts being arranged so that upon energization of the electromagnet field elements by undulating electric currents in displaced phase relation, the movable magnet elements will be periodically magnetically attracted by the stationary elements and the movements of the movable magnet elements will be transmitted to the screen frame through the elongated elements and the movable magnet elements will be retracted by the screen frame supporting springs acting through the elongated elements to vibratingly move portions of the screen in a closed path of movement.

43. In a material screening apparatus, a main frame, an elongated screen frame supporting a screen of perforated material, in substantially a plane at an inclination to the horizontal, the screen frame being supported upon springs on the main frame to move concurrently longitudinally of the plane of the screen and in directions at an angle to the plane of the screen, a pair of devices spaced from the plane of the screen and comprising each an electro-magnet having an energizing field element and an armature element, one of which is movable and the other of which is stationarily supported on the main frame, connections between the movable magnet elements and laterally spaced portions of the screen frame, comprising each an elongated flexible element having a rigid connection at one end portion with the screen frame and at the other end portion having a rigid connection with the movable magnet element and extending at an angle to the screen plane, another device comprising an electro-magnet having an energizing field element and an armature element, one of which is movable and the other of which is stationarily supported on the main frame, a connection between the movable magnet element of the said other device and the screen frame comprising an elongated flexible element having a rigid connection at one end with the screen frame and at the other end having a rigid connection with the movable magnet element and extending generally in the direction of the screen plane, the first two said elongated elements being at an angle to the last named elongated element, the parts being arranged so that upon energizing the first two said electro-magnets in displaced phase relation to each other and upon energizing the third said electro-magnet in displaced phase relation to one of the first two said electro-magnets, the movable magnet elements will be periodically magnetically attracted by the stationary elements, and the movable magnet elements will be retracted by the screen frame supporting springs acting through the elongated elements to vibratingly oscillate lateral portions of the screen frame around a longitudinal portion thereof and concurrently vibrate the screen longitudinally to cause portions of the screen frame to move in a closed path of movement.

GEORGE E. MARKLEY.